(12) United States Patent
Trautmann et al.

(10) Patent No.: US 11,834,890 B2
(45) Date of Patent: Dec. 5, 2023

(54) MOTOR VEHICLE DOOR

(71) Applicant: Brose Fahrzeugteile SE & Co. Kommanditgesellschaft, Bamberg, Bamberg (DE)

(72) Inventors: Michael Trautmann, Neudrossenfeld (DE); Norman Huemmer, Ebensfeld (DE); Michael Jahn, Baunach (DE)

(73) Assignee: BROSE FAHRZEUGTEILE SE & CO. KOMMANDITGESELLSCHAFT, BAMBERG, Bamberg (DE)

(*) Notice: Subject to any disclaimer, the term of this patent is extended or adjusted under 35 U.S.C. 154(b) by 147 days.

(21) Appl. No.: 17/430,606

(22) PCT Filed: Feb. 10, 2020

(86) PCT No.: PCT/EP2020/053312
§ 371 (c)(1),
(2) Date: Aug. 12, 2021

(87) PCT Pub. No.: WO2020/165085
PCT Pub. Date: Aug. 20, 2020

(65) Prior Publication Data
US 2022/0145687 A1  May 12, 2022

(30) Foreign Application Priority Data
Feb. 12, 2019  (DE) ............... 10 2019 201 793.2

(51) Int. Cl.
*E05F 11/54*  (2006.01)
*E05F 15/689*  (2015.01)
(Continued)

(52) U.S. Cl.
CPC .......... *E05F 15/689* (2015.01); *B60J 5/0416* (2013.01); *E05F 11/488* (2013.01);
(Continued)

(58) Field of Classification Search
CPC ..... E05F 15/689; E05F 11/488; B60J 5/0416; E05Y 2201/434; E05Y 2201/64;
(Continued)

(56) References Cited

U.S. PATENT DOCUMENTS 5,694,717 A * 12/1997 Gier ................. E05F 11/481
49/352
5,809,695 A * 9/1998 Strickland ........... E05F 11/488
49/352

(Continued)

FOREIGN PATENT DOCUMENTS

DE  3727153 A1  2/1989
DE  3925864 A1  8/1990
(Continued)

Primary Examiner — Jerry E Redman
(74) Attorney, Agent, or Firm — Dickinson Wright PLLC

(57) ABSTRACT

A motor vehicle door having a frame defining a window opening, and a window lift system having a first guide rail, a first sliding piece guided on the first guide rail, a second guide rail, a second sliding piece guided on the second guide rail, a cable drum and a drive cable driven by the cable drum and coupled to the sliding pieces, the drive cable guided in a Bowden cable sheath between an upper end region of the second guide rail and a connection region located between an upper end region of the first guide rail and a lower end region of the first guide rail. The Bowden cable sheath fastened in the upper end region of the second guide rail and in the connection region of the first guide rail.

19 Claims, 2 Drawing Sheets

(51) Int. Cl.
   *B60J 5/04*    (2006.01)
   *E05F 11/48*   (2006.01)
(52) U.S. Cl.
   CPC ..... *E05Y 2201/434* (2013.01); *E05Y 2201/64* (2013.01); *E05Y 2201/654* (2013.01); *E05Y 2201/664* (2013.01); *E05Y 2201/668* (2013.01); *E05Y 2201/684* (2013.01); *E05Y 2900/55* (2013.01)
(58) Field of Classification Search
   CPC ........... E05Y 2201/66; E05Y 2201/654; E05Y 2201/664; E05Y 2201/668; E05Y 2201/684; E05Y 2900/55
   USPC .......................................................... 49/352
   See application file for complete search history.

(56) References Cited

U.S. PATENT DOCUMENTS

| | | | | |
|---|---|---|---|---|
| 5,960,588 | A * | 10/1999 | Wurm | E05F 11/488 49/502 |
| 6,910,730 | B2 * | 6/2005 | Kinoshita | E05F 11/488 296/146.7 |
| 7,877,932 | B2 * | 2/2011 | Kriese | B60J 1/17 49/502 |
| 9,169,683 | B2 * | 10/2015 | Galliot | E05F 11/486 |
| 10,669,764 | B2 * | 6/2020 | Fortin | E05D 15/165 |
| 11,203,254 | B2 * | 12/2021 | Fortin | E05F 15/689 |
| 2002/0053168 | A1 | 5/2002 | Tatsumi et al. | |
| 2004/0227376 | A1 * | 11/2004 | Kinoshita | B60J 5/101 296/146.6 |
| 2007/0000178 | A1 * | 1/2007 | Wild | E05F 11/382 49/352 |
| 2007/0271849 | A1 * | 11/2007 | Kriese | E05F 11/483 49/348 |
| 2008/0244981 | A1 * | 10/2008 | Arimoto | E05F 11/385 49/352 |
| 2013/0283697 | A1 * | 10/2013 | Galliot | E05F 11/488 49/352 |
| 2014/0102007 | A1 * | 4/2014 | Pavlovic | E05F 15/603 49/352 |
| 2015/0322706 | A1 * | 11/2015 | Yamamoto | E05F 11/488 49/349 |
| 2016/0047411 | A1 * | 2/2016 | Simonneau | E05F 15/695 74/502.5 |
| 2018/0094468 | A1 * | 4/2018 | Stewart | E05D 15/165 |

FOREIGN PATENT DOCUMENTS

| | | |
|---|---|---|
| DE | 19545358 A1 | 6/1996 |
| DE | 69027127 T2 | 10/1996 |
| DE | 202004014652 U1 | 3/2006 |
| DE | 202011051781 U1 | 1/2013 |
| EP | 0164693 A2 | 12/1985 |
| EP | 1380717 A1 | 1/2004 |
| EP | 1778942 B1 | 3/2009 |
| JP | S61134481 A | 6/1986 |

* cited by examiner

MOTOR VEHICLE DOOR

CROSS-REFERENCE TO RELATED APPLICATIONS

This application is the U.S. National Phase of PCT Application No. PCT/EP2020/053312 filed on Feb. 10, 2020, which claims priority to German Patent Application No. DE 10 2019 201 793.2, filed on Feb. 12, 2019, the disclosures of which are hereby incorporated in their entirety by reference herein.

TECHNICAL FIELD

The present disclosure relates to a motor vehicle door, that includes a window lifter system, for use in a car door.

BACKGROUND

In motor vehicles such as cars, trucks or buses, lowerable windowpanes are typically provided at least in a driver's door and a passenger door. For moving the windowpane guided in the vehicle door, window lifter systems are integrated in the vehicle doors. Such a window lifter system generally may include two parallel guide rails, on each of which a follower is guided that can be moved by means of a cable drive, wherein the windowpane is coupled to the follower.

In motor vehicles, driver or passenger doors are typically arranged between a so-called A-pillar and a so-called B-pillar of the vehicle. A window opening of the door is generally limited by an inclined front strut located at the A-pillar and a rear strut located at the B-pillar. The windowpane can be moved by means of the window lifter system between a closed position, in which the pane covers the window opening, and an open position, in which the pane at least partially clears the window opening. Generally, the windowpane is guided along the rear strut between sealing lips or the like over the entire path of movement between the open and closed positions, while the windowpane is guided along the front strut over only a small part of the path of movement due to its inclination. The frictional forces acting on the windowpane are therefore larger in the region of the rear strut.

SUMMARY

In view of this background, one or more objects of the present disclosure may be to provide an improved window lifter concept for a motor vehicle.

Accordingly, a motor vehicle door is provided with a frame, a window lifter system and a windowpane.

The frame defines a window opening which is bounded with respect to a door longitudinal direction by a first strut and a second strut arranged at a distance therefrom. When installing the door in a vehicle, the first strut is to be arranged in the region of the A-pillar, and the second strut is to be arranged in the region of the B-pillar of the vehicle.

The window lifter system may include a first guide rail arranged in the region of the first strut with respect to the door longitudinal direction, a first slide piece guided on the first guide rail, a second guide rail arranged in the region of the second strut with respect to the door longitudinal direction, a second slide piece guided on the second guide rail, a cable drum and a drive cable drivable the cable drum and coupled to the slide pieces. The drive cable is guided in a Bowden cable sheath between an upper end region of the second guide rail and a connecting region of the first guide rail.

The connecting region of the first guide rail is located between an upper end region of the first guide rail and a lower end region of the first guide rail. The Bowden cable sheath is mounted in the upper end region of the second guide rail and in the connecting region of the first guide rail, respectively. Accordingly, the drive cable is guided in sections between the first and second guide rails in a Bowden cable sheath, wherein the Bowden cable sheath is mounted at the upper end of the second guide rail and at a connecting point located between the upper and lower end regions of the first guide rail with respect to the longitudinal extent of the first guide rail. The connecting region may be implemented, for example, by a mounting structure formed integrally with the first guide rail, such as an extension or protrusion.

The upper or first end region and the lower or second end region of the first guide rail are opposite to each other with respect to a rail longitudinal direction of the first guide rail. The upper or first and a lower or second end region of the second guide rail are arranged opposite to one another with respect to a rail longitudinal direction of the second guide rail. The guide rails may extend parallel to each other.

The windowpane is coupled to the sliding pieces of the window lifter system, such as by way of a kinematical coupling or attachment to the sliding pieces. The windowpane has a rear edge, which is guided along the second strut, and a front edge extending obliquely to the rear edge. As an example, the front edge can extend obliquely to the rear edge, at least in sections. This also includes a curved course of the front edge, where a tangent to the front edge runs obliquely or inclined to the rear edge.

The windowpane is movable by means of the sliding pieces into a closed position, in which the windowpane covers the window opening. In the closed position of the windowpane, the first sliding piece is arranged in the upper end region of the first guide rail and the second sliding piece is arranged in the upper end region of the second guide rail. The upper end regions of the first guide rail and the second guide rail are respectively located facing the window opening.

The present disclosure may be based on the principle to guide the drive cable between the second guide rail and the first guide rail in a Bowden cable sheath, and to mount the Bowden cable sheath in the region of the upper end of the second guide rail and in a middle region or connecting region of the first guide rail, which is arranged between the upper and lower end regions of the first guide rail. Thereby the length of the Bowden cable sheath is shortened when compared to a diagonal guide in which the Bowden cable sheath is mounted in the upper end region of the second guide rail and in the lower end region of the first guide rail. Thus, a change in length of the Bowden cable sheath due to settling processes is reduced. Consequently, cable slack formed as a result of settlement is also shortened. In this way, the windowpane can be reliably brought into the closed position when the pulling force is applied by means of the drive cable driven by the cable drum to the sliding piece guided on the first guide slide, to which the region of the windowpane with the inclined front edge is coupled. In particular, this extends the service life of the window lifter system and improves the reliability of the window lifter system over the service life of the vehicle door.

Advantageous embodiments and further configurations result from the dependent claims as well as from the description with reference to the figures of the drawing.

According to an embodiment of the door, it is provided that a first cable section of the drive cable is coupled to the first sliding piece, is guided by means of an upper first cable deflector arranged in the upper end region of the first guide rail to the cable drum, and from the cable drum by means of a lower second cable deflector arranged in a lower end region of the second guide rail to the second sliding piece, and is coupled to the second sliding piece.

Furthermore, it can be provided that a second cable section of the drive cable is coupled to the second sliding piece, is guided by means of an upper second cable deflector arranged in the upper end region of the second guide rail and by means of a lower first cable deflector arranged in the lower end region of the first guide rail to the first sliding piece and is coupled to the first sliding piece. When a pulling force is applied to the first sliding piece by means of the first cable section by rotating the cable drum, this pulling force is transmitted from the first sliding piece to the second sliding piece as a pulling force by means of the second cable section. In this way, an efficient transfer of the pulling force applied by the cable drum to the first cable section by means of the first sliding section to the second sliding section is achieved. Since the Bowden cable sheath is mounted to the first guide rail between the first upper cable deflector and the first lower cable deflector, there is also an advantageously tight cable guiding between the first lower cable deflector and the connecting point of the Bowden cable sheath to the first guide rail. This further improves the reliability with which the windowpane can be moved into the closed position in the event of cable slack due to settlement of the Bowden cable sheath.

According to a further embodiment, the Bowden cable sheath is arranged in the connecting region at a distance from the lower first cable deflector which is between 25% and 75% of a distance between the upper first cable deflector and the lower first cable deflector. Accordingly, a distance at which the connecting point of the Bowden cable sheath is arranged from the lower first cable deflector is between one quarter and three quarters of the distance between the first lower cable deflector and the second lower cable deflector. In this distance range, a low cable friction is advantageously achieved with a shortening of the Bowden cable sheath when compared to a diagonal attachment of the Bowden cable sheath.

As an example, the connecting point is arranged somewhat off-center closer to the first upper cable deflector, i.e. at a distance from the lower first cable deflector which is between 55% and 70% of the distance between the upper first cable deflector and the lower first cable deflector. In this range, a particularly preferable ratio between shortening of the Bowden cable sheath and reduced cable friction is achieved.

According to a further embodiment, one or more of the cable deflectors are configured as deflector rollers. Thereby, the cable friction at the deflection points may be reduced.

According to a further embodiment of the motor vehicle door, the first guide rail has a first stop in the upper end region, and the second guide rail has a second stop in the upper end region, wherein, in the closed position of the windowpane, the second sliding piece abuts against the second stop, and the first sliding piece is arranged at a predetermined distance from the first stop. Accordingly, only one of the two sliding pieces is moved against a stop when the windowpane coupled to the sliding pieces is moved into the closed position. As an example, the cable length of a cable section of the drive cable to which the first sliding piece, which is to be arranged at a distance from the respective stop in the closed position of the windowpane, is to be mounted, can be configured accordingly. In this way, a defined position of the sliding pieces in the closed position of the roller is advantageously established, while at the same time the transmission of the pulling force from the first sliding piece to the second sliding piece is improved.

As an example, it can be provided that the predetermined distance is greater than or equal to 2 mm, and less than or equal to 8 mm. In this range, a safe reserve for settlements or length changes of the Bowden cable sheath is provided. As another example, the predetermined distance is greater than or equal to 3 mm, and less than or equal to 6 mm. This distance may be advantageous, despite a sufficiently large reserve for settlements or changes in length of the Bowden cable sheath, tilting of the windowpane is kept small as a result of the different position of the sliding pieces with respect to the longitudinal extension of the guide rails.

According to a further embodiment, the first stop can be formed integrally with the first guide rail. Alternatively or additionally, the second stop can also be formed integrally with the second guide rail. The one-piece configuration of the stop with the respective guide rail offers the advantage that the number of individual parts of the window lifter system is reduced. This facilitates, for example, the assembly of the motor vehicle door.

According to a further embodiment of the motor vehicle door, it is provided that the windowpane is guided at the rear edge by a guide structure along the second strut. The guide structure can be formed, for example, by opposing lips which define a guide slot into which the rear edge of the pane is inserted. In one or more embodiments, the pane abuts against both lips.

Optionally, the guide structure extends parallel to the second guide rail.

The above embodiments and further configurations can be combined with each other as desired, if useful. Further possible embodiments, further configurations and implementations of the invention also comprise combinations, not explicitly mentioned, of features of the invention described above or below with respect to the exemplary embodiment. In particular, the skilled person prefers to add single aspects as improvements or additions to the respective basic form of the present invention.

BRIEF DESCRIPTION OF THE DRAWINGS

The present invention is explained in more detail below with reference to the exemplary embodiments given in the schematic figures of the drawings, wherein.

Figure 1:
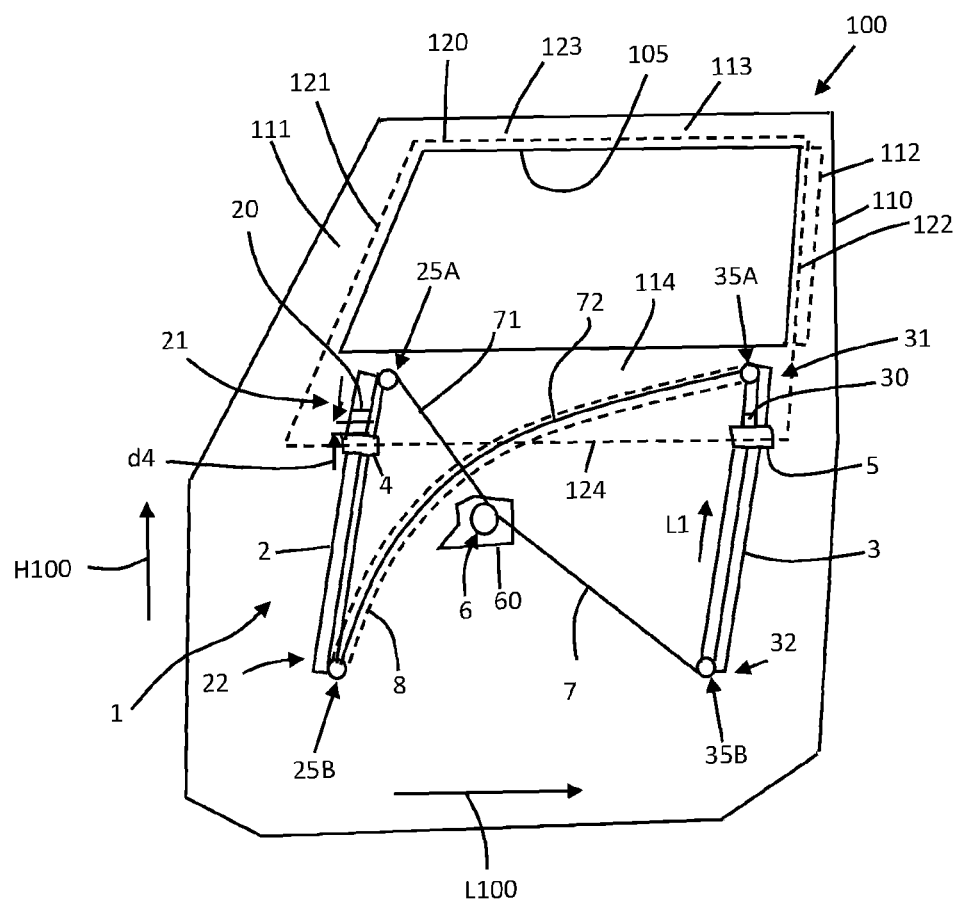
FIG. 1 is a schematic representation of a motor vehicle door according to an embodiment of the present invention.

The accompanying drawings are intended to provide a further understanding of embodiments of the invention. They illustrate embodiments and, in connection with the description, serve to explain principles and concepts of the invention. Other embodiments and many of the advantages mentioned will be apparent with reference to the drawings. The elements shown in the drawings are not necessarily shown to scale with respect to each other.

In the figures of the drawing, the same elements, features and components, which have the same function and act in the same way, are each identified with the same reference signs, unless otherwise stated.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Window lifter systems are therefore often configured in such a way that a pulling force for moving the windowpane into the closed position is applied by means of a cable driven directly by a cable drive to a rear sliding piece, which is guided on a guide rail arranged in the region of the rear strut. A front sliding piece, which is guided on a guide rail arranged in the region of the front strut, is coupled to the rear sliding piece by means of the cable in order to apply a pulling force. Such a system is disclosed, for example, in the German utility model DE 20 2011 051 781 U1 or in the German patent application DE 37 27 153 A1.

Document EP 1 778 942 B1 discloses to apply the pulling force from the cable drive to the sliding piece, which is guided at the guide rail arranged at the front strut. A similar system for moving a roller blind on a vehicle door is disclosed in the German utility model DE 20 2004 014 652 U1.

Since window lifter systems in motor vehicle doors are frequently exposed to high temperature fluctuations, and since large forces act on the cable drive when the windowpane is moved, settlement processes of the cable components or similar phenomena can occur over time, which affect the positionability of the sliding pieces or followers on the respective guide rail. This may cause a condition where the windowpane may no longer be brought reliably into the closed position.

Therefore, there is a need for an improvement in order to avoid this condition.

FIG. 1 shows exemplarily and schematically a motor vehicle door 100 for a motor vehicle which is not shown here. The motor vehicle door 100 may be provided, for example, as a driver's door or passenger door for a car. The motor vehicle door 100 may include a frame 110, a windowpane 120, an optional guide structure 130, and a window lifter system 1.

As shown schematically in FIG. 1, the frame 100 has a first strut 111, a second strut 112, an optional connecting strut 113, and an optional base section 114. The first and second struts 111, 112 are spaced apart from each other with respect to a door longitudinal direction L100 and are arranged stationary relative to each other. The first strut 111 extends obliquely or angled relative to the second strut 112. The connecting strut 113 extends along the door longitudinal direction L100 and connects the first and second struts 111, 112 at an upper end region. The base region or base section 114 is spaced apart from the connecting strut 113 with respect to a door upward direction H100 extending transversely to the door longitudinal direction L100 and connects the first and second struts 111, 112 in a lower end portion located opposite to the upper end portion. The first strut 111, the second strut 112, the connecting strut 113 and the base section 114 together define a window opening 105. As can be seen in FIG. 1, the window opening 105 is bounded with respect to the door longitudinal direction L100 by a first strut 111 and the second strut 112 and with respect to the door upward direction H100 by the base section 114 and the connecting strut 113. In particular, the window opening 105 may have a polygonal periphery, as shown as an example in FIG. 1. Of course, it is also conceivable that the first strut 111 and the connecting strut 113 merge continuously into one another, for example by both extending in a curved manner such that they form a continuous arc together.

The optional guide structure 130 is shown in FIG. 1 only schematically as a dash-dotted line. As can be seen in FIG. 1, the guide structure 130 is arranged on the second strut 112, and can be implemented in particular by two lips (not shown) extending along the second strut 112 and defining a guide slot. The lips may, for example, be made of an elastically deformable material, such as a foam or the like.

The window lifter system 1 is used to move the windowpane 120 along the door upward direction H100 and will be explained in further detail below.

The windowpane 120 has a planar extension sufficient to completely cover the window opening 105 of the frame 110. In particular, the windowpane 120 may have a front edge 121 facing the first strut 111, a rear edge 122 facing the second strut 112, an upper edge 123 connecting the front edge 121 and the rear edge 122 and facing the connecting strut 113, and a lower edge 124 opposite to the upper edge 123 with respect to the door upward direction H100, which also extends between the front edge 121 and the rear edge 122, as shown as an example in FIG. 1. As shown schematically in FIG. 1, the front edge 121 extends at an angle or angled relative to the rear edge 122. Similar to the window opening 105, the front edge 121 and the upper edge 123 of the window 120 may be implemented as a single continuous, such as a curved edge.

In FIG. 1, the windowpane 120 is schematically indicated as a dotted line, wherein FIG. 1 shows the arrangement of the windowpane 120 in a closed position. In the closed position, the windowpane 120 covers the window opening 105, and in particular the windowpane 120 covers the window opening 105 completely. In an open position (not shown), the windowpane 120 at least partially opens the window opening 105. In the open position, the upper edge 123 of the windowpane 120 is arranged at a distance from the connecting strut 113 with respect to the vertical direction H100, or a distance between the upper edge 123 of the windowpane 120 and the base section 114 is reduced when compared to the closed position. For moving the windowpane 120 between the open position and the closed position, the windowpane 120 is coupled to the window lifter system 1, for example at the lower edge 124.

The rear edge 122 of the windowpane 120 is guided along the second strut 112. In particular, the rear edge 122 of the windowpane 120 may be guided in the guide structure 130, for example by the rear edge 122 being guided in the slot formed between the lips. Optionally, the rear edge 122 is guided in the guide structure 130 along an entire travel distance by which the windowpane 120 is moved during movement between the open position and the closed position.

Figure 2:
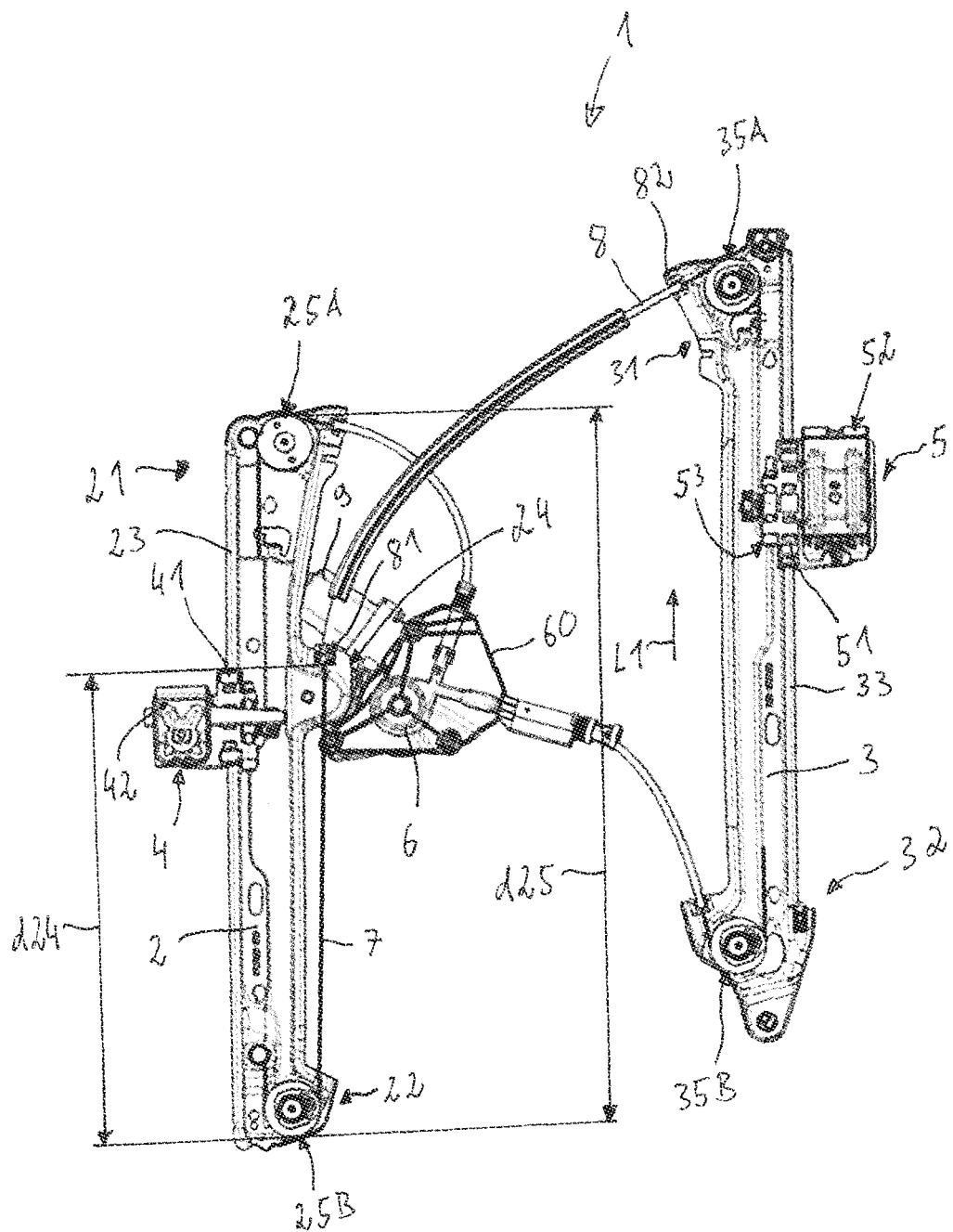
FIG. 2 is a window lifter system of a motor vehicle door according to an exemplary embodiment of the present invention.

As shown schematically in FIG. 1, the window lifter system 1 has a first guide rail 2, a second guide rail 3, a first sliding piece 4 guided on the first guide rail 2, a second sliding piece 5 guided on the second guide rail 3, a cable drum 6, a drive cable 7 and a Bowden cable sheath 8 shown only schematically by dashed lines in FIG. 1. FIG. 2 shows a window lifter system 1 separate from the motor vehicle door 100.

As can be seen in particular in FIG. 2, the guide rails 2, 3 can be implemented as profiled rails, each of which extends in a rail longitudinal direction L1. The guide rails 2, 3 each define a guide track extending in the rail longitudinal direction L1. The guide track can, for example, be defined in each case by a lateral profile section 23, 33 of the respective guide rail 2, 3, which can, for example, have an arcuate or L-shaped cross section. The guide rails 2, 3 can in particular be made of a metal material, such as an aluminum alloy.

As schematically shown in FIG. 1, the first guide rail 2 has an optional first stop 20. The first stop 20 is arranged in a first, upper end region 21 of the first guide rail 2 with respect to the rail longitudinal direction L1. The first stop 20 can be implemented, for example, as an L-shaped formation of the first guide rail 2. In general, the first stop 20 may be integrally formed with the first guide rail 2.

As further schematically shown in FIG. 1, the second guide rail 3 has an optional second stop 30. The second stop 30 is arranged in a first, upper end region 31 of the second guide rail 3 with respect to the rail longitudinal direction L1. For example, the second stop 30 can be implemented as an L-shaped formation of the second guide rail 3. In general, the second stop 30 may be integrally formed with the second guide rail 3.

The first sliding piece 4 is guided on the first guide rail 2 along the longitudinal direction of the rail L1. As shown by way of example in FIG. 2, the first sliding piece 4 can have a guide section 41 that engages with the guide rail 2, in particular with the profile section 23. Further, a coupling section 42 may be provided for coupling the windowpane 120 to the first sliding piece 4 and a pulling section 43 may be provided for coupling the drive cable 7 to the first sliding piece 4, as shown as an example in FIG. 2.

The second sliding piece 5 is guided on the second guide rail 3 along the longitudinal direction of the rail L1. As exemplarily shown in FIG. 2, the second sliding piece 4 can have a guide section 51, which engages with the guide rail 3, in particular with the profile section 33. Further, a coupling section 52 may be provided for coupling the windowpane 120 to the second sliding piece 5 and a pulling section 53 may be provided for coupling the drive cable 7 to the second sliding piece 5, as shown as an example in FIG. 2.

As shown in FIGS. 1 and 2, the first and second guide rails 2, 3 are arranged at a distance from one another, wherein the guide track of the first guide rail 2 and the guide track of the second guide rail 3 may extend parallel to one another. In the exemplary installation of the window lifter system 1 in the motor vehicle door 100 shown in FIG. 1, the first guide rail 2 is arranged in the region of the first strut 111, and the second guide rail 3 is arranged in the region of the second strut 112. The guide rails 2, 3 further extend along the door longitudinal direction L100, wherein the first or upper end region 21 of the first guide rail 2 and the first or upper end region 31 of the second guide rail 3 are each located facing the window opening 105. As an example, the second guide rail 3 and the guide structure 130 extend parallel to each other. Generally, the guide rails 2, 3 are arranged stationary relative to the window opening 105 and the frame 110, respectively.

As further shown schematically in FIG. 1, the windowpane 120 is coupled to the sliding pieces 4, 5. In particular, the lower edge 124 of the windowpane 120 may be held in the coupling structure 42, 52 of the respective sliding piece 4, 5.

The cable drum 6 is rotatably mounted about an axis of rotation. The cable drum 6 can, for example, be rotatably mounted on a bottom or base plate 60, as shown in FIGS. 1 and 2 by way of example and schematically illustrated. The base plate 60 or, more generally, the axis of rotation of the cable drum 6 is arranged in a stationary manner relative to the guide rails 2, 3. For rotating the cable drum 6, for example, an electric motor 9 can be provided as a drive device. Alternatively, however, it is also conceivable to provide an actuating lever (not shown) for manual actuation of the cable drum 6 as the drive device.

The drive cable 7 is coupled to both the first sliding section 4 and the second sliding section 5. For example, a first cable section 71 of the drive cable 7 may be mounted to the pulling section 43 of the first sliding piece 4 and a second cable section 72 of the drive cable 7 may be mounted to the pulling section 53 of the second sliding piece 5. Furthermore, the drive cable 7 is coupled to the cable drum 6 and thus drivable by the cable drum 6. For example, it may be provided that the cable 7 loops around the cable drum 6 one or more times, and/or that the cable 7 is mounted to the cable drum 6 by means of a clamping device (not shown).

FIGS. 1 and 2 show an exemplary possible cable guiding for the drive cable 7. In particular, it can be provided that the first cable section 71 is guided to the cable drum 6 by means of an upper first cable deflector 25A arranged in the upper end region 21 of the first guide rail 2. From the cable drum 6, to which the first cable section 71 is coupled, the cable section is guided by means of a lower second cable deflector 35B arranged in a second, lower end region 32 of the second guide rail 3 to the second sliding piece 5, to which the first cable section 71 is also mounted. The second, lower end region 32 of the second guide rail 3 is arranged opposite the first, upper end region 31 of the second guide rail 3 with respect to the longitudinal direction L1 of the rail. The second cable section 72 of the drive cable 7 is guided to the first sliding piece 4 by means of an upper second cable deflector 35A arranged in the upper end region 31 of the second guide rail 3 and by means of a lower first cable deflector 25B arranged in a second, lower end region 22 of the first guide rail 2, and is coupled to the first sliding piece 4. The second, lower end region 22 of the first guide rail 2 is located opposite to the first, upper end region 21 of the first guide rail 2 with respect to the rail longitudinal direction L1.

As can be seen in particular in FIG. 2, the guide rails 25A, 25B, 35A, 35B can each be formed as deflector rollers. The deflector rollers are each mounted on the respective guide rail 2, 3 so as to be rotatable about an axis of rotation.

By rotating the cable drum 6, one of the cable sections 71, 72 is shortened and the other cable section 72, 71 is lengthened. To move the sliding pieces 4, 5 in the direction of the stops or the first end sections 21, 31, a pulling force is exerted on the first sliding piece 4 by the first cable section 71. By coupling the second cable section 72 to the first sliding piece 4, this pulling force is transmitted to the second sliding piece 5 as a pulling force acting in the direction of the second stop 30 or in the direction of the upper end region 31 of the second guide rail 3 due to the cable guiding by means of the cable deflectors 25B, 35A. Consequently, a pulling force is applied to both sliding pieces 4, 5 and the windowpane 120 is moved along the guide rails 2, 3. In general, the drive cable 7 is thus guided in such a way that a pulling force acting in the direction of the first stop 20 can be applied directly to the first sliding piece 4 by means of the cable drum 6 by means of the first cable section 71, and the pulling force is transmitted, at least partially, to the second sliding piece 5 by means of the second cable section 72 as a pulling force acting in the direction of the second stop 30.

As shown schematically in FIG. 1 and in detail in FIG. 2, the second cable section 71 is guided in a Bowden cable sheath 8 between the upper end region 31 of the second guide rail 3 and a connecting region 24 of the first guide rail 2. The connecting region 24 is located between the upper end region 21 and the lower end region 22 of the first guide rail 2 with respect to the rail longitudinal direction L1. The connecting region 24 can be implemented, for example, by a mounting structure formed integrally with the first guide rail, such as an extension or projection, as shown by way of example in FIG. 2.

As can be seen in particular in FIG. 2, the Bowden cable sheath 8 runs in an arc between the upper end region 31 of the second guide rail 3 and the connecting region 24 of the first guide rail 2. The Bowden cable sheath 8 is mounted to the first guide rail 2 in the connecting region 24 at a connecting point or mounting point. For example, the Bowden cable sheath 8 can be provided with end sleeves 81, 82, a first end sleeve 81 being mounted, e.g. screwed, to the connecting point in the connecting region 24 of the first guide rail 2, and a second end sleeve 82 being mounted, e.g. screwed, to the second guide rail 3, as shown by way of example in FIG. 2. A length of the Bowden cable sheath 8 is longer than a shortest distance between the connecting points of the end sleeves 81, 82 on the respective guide rail 2, 3 due to the arcuate course. The Bowden cable sheath 8 can in particular be formed from a plastic material.

As shown schematically in FIGS. 1 and 2, the connecting point to which the Bowden cable sheath 8 is mounted in the connecting region 24 of the first guide rail 2 is arranged at a distance d24 from the lower first cable deflector 25B. The distance d24 can be measured in particular along the rail longitudinal direction L100 between the connecting point and a surface of the lower first cable deflector 25B, on which the drive cable 7 is guided and which is located facing away from the connecting point with respect to the rail longitudinal direction L1, as this is shown schematically in FIG. 2.

In FIG. 2, it is shown by way of example that the connecting region 24 or the connecting point is arranged somewhat off-center with respect to the longitudinal direction of the rail L1, closer to the first upper deflector 25A than to the first lower deflector 25B. For example, the distance d24 between the lower first cable deflector 25B and the connecting point of the Bowden cable sheath 8 to the first guide rail 2 can be between 55% and 70% of the distance d25 between the upper first cable deflector 25A and the lower first cable deflector 25B. The distance d25 between the upper first cable deflector 25A and the lower first cable deflector 25B can in particular be arranged along the longitudinal direction L1 of the rail between the surface of the lower first cable deflector 25B, on which the drive cable 7 is guided and which is located facing away from the connecting point with respect to the longitudinal direction L1 of the rail, and a surface of the upper first cable deflector 25A, on which the drive cable 7 is guided and which is located facing away from the connecting point with respect to the longitudinal direction of the rail L1, as shown in FIG. 2 by way of example. In general, the distance d24 between the lower first cable deflector 25B and the connecting point of the Bowden cable sheath 8 to the first guide rail 2 can be between 25% and 75% of the distance d25 between the upper first cable deflector 25A and the lower first cable deflector 25B.

As can be seen in particular with respect to FIG. 2, a relatively short arc length of the Bowden cable sheath 8 can be implemented by fastening the Bowden cable sheath 8 in the connecting region 24 to the first guide rail 2 between the upper and the lower first cable deflector 25A, 25B, whereby cable slacks occurring as a result of settling processes of the Bowden cable sheath 8 are advantageously shortened. Furthermore, a relatively tight cable guiding of the drive cable 7 can be advantageously implemented between the connecting point of the Bowden cable sheath 8 at the first guide rail 2 and the lower first deflector roller 25B. This is particularly the case if the distance d24 between the lower first cable deflector 25B and the connecting point of the Bowden cable sheath 8 on the first guide rail 2 is between 25% and 75% of the distance d25 between the upper first cable deflector 25A and the lower first cable deflector 25B.

As explained above, FIG. 1 shows the arrangement of the window 120 in a closed position. In the closed position of the windowpane 120, the sliding pieces 4, 5 of the window lifter system 1 are arranged in a closed position. In the closed position, the sliding pieces 4, 5 are arranged in the upper end region 21, 31 of the respective guide rail 2, 3 with respect to the rail longitudinal direction L1. As can be seen in FIG. 1, in the closed position the second sliding piece 5 may abut against the optional second stop 30, and the first sliding piece 4 may be arranged at a predetermined distance d4 from the first stop 20. This spacing ensures that the pulling force applied on the first sliding piece 4 is reliably transmitted to the second sliding piece 5 by the second cable section 72 when the windowpane 120 is moved to the closed position, as explained above. Specifically, the predetermined distance d4 may be greater than or equal to 2 mm, and less than or equal to 8 mm, such as greater than or equal to 3 mm, and less than or equal to 6 mm. These distance ranges have proven to be particularly advantageous, since in these ranges it is ensured that even in the event of a considerable settlement of the Bowden cable sheath 8, an impact of the first sliding piece 4 against the first stop is reliably avoided.

In the event of a change in length of the Bowden cable sheath 8, the first sliding piece 4 in the closed position A may be closer to the optional first stop 4 than was intended in the original configuration. This leads to a tilting of the windowpane 120, since the sliding pieces 4, 5 are no longer arranged at the level intended according to the configuration with respect to the door upward direction H100. In particular, the aforementioned distance range of the distance d4 of greater than or equal to 3 mm to less than or equal to 6 mm allows, on the one hand, a wide range of length changes of the Bowden cable sheath 8 to be compensated, whereby the resulting pane tilt is limited to a tolerable amount.

Although the present invention has been fully described above with reference to preferred examples of embodiment, the invention is not limited thereto, but can be modified in a variety of ways.

With respect to directional indications and axes, such as to directional indications and axes relating to the arrangement of physical structures, an arrangement of an axis, a direction or a structure "along" another axis, direction or structure, is to be understood, such as the tangents resulting in a respective location of the structures, in such a way that the directional indications and axes each run at an angle of less than 45 degrees, such as less than 30 degrees, and possibly parallel to one another.

With respect to directional indications and axes, in particular with respect to directional indications and axes relating to the arrangement of physical structures, an arrangement of an axis, a direction or a structure "transversely" to another axis, direction or structure, is to be understood, in particular the tangents resulting in a respective location of the structures, each run at an angle of greater than or equal to 45 degrees, in such a way that the directional indications and axes are preferably greater than or equal to 60 degrees, and, for example, perpendicular to one another.

As used herein, components which are configured as "one-piece", "integral" or "in one piece", are generally understood to be present as a single part forming a material unit, and, in particular, are manufactured as such, wherein one component is not detachable from the other without breaking the material cohesion of the other component.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

1 Window lifter system
2 First guide rail
3 Second guide rail
4 First sliding piece
5 Second sliding piece
6 Cable drum
7 Drive cable
8 Bowden cable sheath
9 Electric motor
20 First stop
21 Upper end region of first guide rail
22 Lower end region of first guide rail
23 Profile section of the first guide rail
24 Connecting region of the first guide rail
25A Upper first cable deflector
25B Lower first cable deflector
30 Second stop
31 Upper end region of second guide rail
32 Lower end region of second guide rail
33 Profile section of the second guide rail
35A Upper second cable deflector
35B Lower second cable deflector
41 Guide section of the first sliding piece
42 Coupling section of the first sliding piece
43 Pulling section of the first sliding piece
51 Guide section of the second sliding piece
52 Coupling section of the second sliding section
53 Pulling section of the second sliding piece
60 Base plate
71 First cable section of the drive cable
72 Second cable section of the drive cable
81 First end sleeve
82 Second end sleeve
100 (Motor Vehicle) Door
105 Window opening
110 Frame
111 First strut
112 Second strut
113 Connecting strut
114 Base section
120 Windowpane
121 Front edge of windowpane
122 Rear edge of windowpane
123 Upper edge
124 Lower edge
130 Guide structure
d4 Distance
d24 Distance between lower first deflector roller and connecting point of the Bowden cable sheath on the first guide rail
d25 Distance between lower first deflector roller and upper first deflector roller
L1 Rail longitudinal direction
L100 Door longitudinal direction
H100 Door vertical direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A motor vehicle door comprising:
a frame defining a window opening bounded, with respect to a door longitudinal direction, by a first strut and a second strut spaced apart from the first strut; and
a window lifter system including
a first guide rail arranged in a region of the first strut with respect to the door longitudinal direction,
a first sliding piece guided on the first guide rail,
a second guide rail arranged in the region of the second strut with respect to the door longitudinal direction,
a second sliding piece guided on the second guide rail,
a cable drum, and
a drive cable configured to be driven by the cable drum and coupled to the first and second sliding pieces, wherein the drive cable is guided between an upper end region of the second guide rail and a connecting region disposed between an upper-end region of the first guide rail and a lower-end region of the first guide rail in a Bowden cable sheath;
wherein the Bowden cable sheath is mounted in the upper-end region of the second guide rail and in the connecting region of the first guide rail, respectively;
a windowpane coupled to the first and second sliding pieces and provided with a rear edge, configured to be guided along the second strut, and a front edge extending obliquely to the rear edge;
wherein the first and second sliding pieces are configured to move the windowpane to a closed position in which the windowpane covers the window opening and the first sliding piece is disposed in the upper end region of the first guide rail and the second sliding piece is disposed in the upper end region of the second guide rail,
wherein the first guide rail includes a first stop disposed in the upper-end region and spaced apart from an end of the first guide rail, and the second guide rail includes a second stop disposed in the upper-end region and spaced apart from an end of the second guide rail, wherein when the windowpane is in the closed position, the second sliding piece abuts against the second stop, and the first sliding piece is arranged at a predetermined distance from the first stop.

2. The motor vehicle door of claim 1, wherein a first cable section of the drive cable is coupled to the first sliding piece, guided by means of an upper-first cable deflector-arranged in the upper end region of the first guide rail to the cable drum, and from the cable drum by means of a lower second cable deflector arranged in a lower end region of the second guide rail to the second sliding piece, and is coupled to the second sliding piece.

3. The motor vehicle door of claim 2, wherein a second cable section of the drive cable is coupled to the first sliding piece and the second sliding piece, and guided to the first sliding piece by an upper second cable deflector, disposed in the upper-end region of the second guide rail and by means of a lower first cable deflector arranged in the lower end region of the first guide rail.

4. The motor vehicle door of claim 3, wherein the Bowden cable sheath is disposed in the connecting region and the connecting region is spaced apart by a first distance from the lower first cable deflector, wherein the first distance is between 25% and 75% of a second distance extending between the upper first cable deflector and the lower first cable deflector.

5. The motor vehicle door of claim 4, wherein one or more of the cable deflectors are formed as deflector rollers.

6. The motor vehicle door of claim 1, wherein predetermined distance is greater than or equal to 2 mm and less than or equal to 8 mm.

7. The motor vehicle door of claim 6, wherein the first stop is formed integrally with the first guide rail and/or the second stop is formed integrally with the second guide rail.

8. The motor vehicle door of claim 6, wherein the predetermined distance is greater than or equal to 3 mm and less than or equal to 6 mm.

9. The motor vehicle door of claim 1, wherein the rear edge of the windowpane is configured to be guided along the second strut by a guide structure.

10. The motor vehicle door of claim 9, wherein the guide structure extends parallel to the second guide rail.

11. A window lifter system for use in a vehicle door, the window lifter system comprising:
    a first guide rail;
    a first sliding piece configured to move along the first guide rail;
    a second guide rail spaced apart from the first guide rail in a longitudinal direction;
    a second sliding piece configured to move along the second guide rail, the first sliding piece and the second sliding piece collectively configured to carry a windowpane between an open position and a closed position;
    a cable drum;
    a drive cable configured to be driven by the cable drum and coupled to the first and second sliding pieces, wherein a portion of the drive cable is guided between an upper-end region of the second guide rail and a connecting region disposed between an upper-end region of the first guide rail and a lower-end region of the first guide rail; and
    a Bowden cable sheath covering the portion of the drive cable,
    wherein the first guide rail includes a first stop disposed in the upper-end region and spaced apart from an end of the first guide rail, and the second guide rail includes a second stop disposed in the upper-end region and spaced apart from an end of the second guide rail, wherein when the windowpane is in the closed position, the second sliding piece abuts against the second stop, and the first sliding piece is arranged at a predetermined distance from the first stop.

12. The window lifter system of claim 11, further comprising:
    an upper-first pulley fixed to an upper portion of the first guide rail; and
    a lower-first pulley fixed to a lower portion of the first guide rail, wherein a first section of the drive cable is coupled to the first sliding piece and is guided by the upper-first pulley and from the cable drum by the lower-first pulley, wherein the connecting region is spaced apart from the lower-first pulley by a first distance, and the upper-first pulley and the lower-first pulley are spaced apart from one another by a second distance, and wherein the first distance is at least 25% of the second distance.

13. The window lifter system of claim 12, wherein the first distance is at least 75% of the second distance.

14. The window lifter system of claim 11, wherein the first guide rail includes a first stop and the second guide rail includes a second stop, wherein the first and second sliding pieces are configured to move a windowpane towards a closed position, in which the second sliding piece abuts against the second stop and the first sliding piece is spaced apart from the first stop by a predetermined distance.

15. The window lifter system of claim 14, wherein the predetermined distance is equal to or greater than 2 mm.

16. The window lifter system of claim 14, wherein the predetermined distance is equal to or less than 8 mm.

17. The window lifter system of claim 14, wherein the first stop is integral to the first guide rail.

18. The window lifter system of claim 14, wherein the second stop is integral to the second guide rail.

19. A motor vehicle door comprising:
    a frame including a first strut and a second strut spaced apart from the first strut in a longitudinal direction, the first strut and the second strut collectively defining a window opening configured to be covered by a windowpane when the windowpane is in a closed position;
    a first guide rail disposed below the first strut;
    a first sliding piece configured to move along the first guide rail;
    a second guide rail disposed below the second strut;
    a second sliding piece configured to move along the second guide rail;
    a cable drum;
    a drive cable configured to be driven by the cable drum and coupled to the first and second sliding pieces, wherein a portion of the drive cable is guided between an upper-end region of the second guide rail and a connecting region disposed between an upper-end region of the first guide rail and a lower-end region of the first guide rail;
    an upper-first pulley fixed to an upper portion of the first guide rail; and
    a lower-first pulley fixed to a lower portion of the first guide rail, wherein a first section of the drive cable is coupled to the first sliding piece and is guided by the upper-first pulley and from the cable drum by the lower-first pulley, wherein the connecting region is spaced apart from the lower-first pulley by a first distance, and the upper-first pulley and the lower-first pulley are spaced apart from one another by a second distance, and wherein the first distance is at least 25% of the second distance,
    wherein the first guide rail includes a first stop disposed in the upper-end region and spaced apart from an end of the first guide rail, and the second guide rail includes a second stop disposed in the upper-end region and spaced apart from an end of the second guide rail, wherein when the windowpane is in the closed position, the second sliding piece abuts against the second stop, and the first sliding piece is arranged at a predetermined distance from the first stop.

\* \* \* \* \*